United States Patent
Alexander et al.

(10) Patent No.: US 12,320,394 B2
(45) Date of Patent: Jun. 3, 2025

(54) POWER DRIVE UNIT DRIVESHAFT WITH WOBBLE CONNECTION

(71) Applicant: Brose Fahrzeugteile SE & Co. Kommanditgesellschaft, Bamberg, Bamberg (DE)

(72) Inventors: Shane Alexander, Ortonville, MI (US); Michael Kidd, Oxford, MI (US); Andrew Lakerdas, London (CA)

(73) Assignee: Brose Fahrzeugteile SE & Co. Kommanditgesellschaft, Bamberg (DE)

(*) Notice: Subject to any disclaimer, the term of this patent is extended or adjusted under 35 U.S.C. 154(b) by 9 days.

(21) Appl. No.: 17/980,750

(22) Filed: Nov. 4, 2022

(65) Prior Publication Data
US 2024/0151274 A1    May 9, 2024

(51) Int. Cl.
*F16D 3/20*      (2006.01)
*E05F 15/611*    (2015.01)

(52) U.S. Cl.
CPC .............. *F16D 3/20* (2013.01); *E05F 15/611* (2015.01); *E05Y 2201/706* (2013.01); *E05Y 2900/542* (2013.01)

(58) Field of Classification Search
CPC ... F16D 3/20; F16D 3/22; E05F 15/611; B60J 5/102; B60J 5/103
See application file for complete search history.

(56) References Cited

U.S. PATENT DOCUMENTS

| | | | | |
|---|---|---|---|---|
| 96,406 | A * | 11/1869 | Dugdale | F16D 3/20 464/155 |
| 218,278 | A * | 8/1879 | Kimball | F16D 3/20 285/263 |
| 1,802,899 | A * | 4/1931 | Knight | F16D 3/20 464/7 |
| 2,780,080 | A * | 2/1957 | Cork | F16D 3/20 464/106 |
| 3,940,946 | A * | 3/1976 | Andersen | F16D 3/20 464/89 |
| 5,069,569 | A * | 12/1991 | Lieser | F16D 3/20 403/57 |
| 5,370,021 | A * | 12/1994 | Shigematsu | B25B 13/481 81/436 |
| 5,738,586 | A * | 4/1998 | Arriaga | F16D 1/101 464/106 |
| 8,640,575 | B2 | 2/2014 | Huang | |

(Continued)

FOREIGN PATENT DOCUMENTS

GB        2 138 104     * 10/1984

*Primary Examiner* — Gregory J Strimbu
(74) *Attorney, Agent, or Firm* — Dickinson Wright PLLC

(57) ABSTRACT

A drive system for a tailgate and including a drive unit having a first coupler supported for rotation about a first longitudinal axis and defining a receptacle. A second coupler including a first side and a second side configured to engage with a hinge component of a vehicle and defining a second longitudinal axis. A driveshaft extends between the first and second couplers at an angled orientation relative to the first and second axes via wobble connections formed between a first end of the driveshaft and the first coupler and between a second end of the driveshaft and the first side of the second coupler.

17 Claims, 5 Drawing Sheets

(56) References Cited

U.S. PATENT DOCUMENTS

| | | | |
|---|---|---|---|
| 2008/0168868 A1* | 7/2008 | Yang | F16D 3/20 81/177.75 |
| 2018/0266161 A1* | 9/2018 | Jergess | E05F 15/611 |
| 2023/0203869 A1* | 6/2023 | Sproule | E05F 5/025 16/49 |
| 2023/0407692 A1* | 12/2023 | Fritschle | E05F 15/611 |
| 2024/0352780 A1* | 10/2024 | Janneck | E05F 15/616 |

* cited by examiner

_US 12,320,394 B2_

POWER DRIVE UNIT DRIVESHAFT WITH WOBBLE CONNECTION

TECHNICAL FIELD

The present disclosure relates to powered vehicle closures and more specifically drive systems for opening and closing the closure.

BACKGROUND

Vehicles may include one or more closures, such as, hatches, doors, tailgates, liftgates. Certain closures are powered to close automatically. Vehicles generally include a seal or other type of weather proofing barrier positioned between the closure and the vehicle body to mitigate external elements such as moisture, precipitation, dirt, debris, and noise from entering the interior of the vehicle.

SUMMARY

According to one embodiment, a drive system for a vehicle closure includes a drive unit having a first coupler supported for rotation about a first longitudinal axis. The first coupler defines a receptacle. A second coupler has a first side and a second side configured to engage with a hinge component of a vehicle and is supported for a rotation about a second longitudinal axis that is parallel to and offset from the first axis. A driveshaft extends between the first and second couplers at an angled orientation relative to the first and second axes. The driveshaft has a first end connected to the first coupler and a second end connected to the first side of the second coupler. The first end defines a plurality of engaging surfaces that are arcuate in a direction parallel to a third longitudinal axis of the driveshaft and are circumferentially arranged around the third axis such that the engaging surfaces are joined to each other at edges that are arcuate in the direction parallel to the third axis, wherein the first end is received in the receptacle of the first coupler with the engaging surfaces disposed against sides of the receptacle such that the engaging surfaces are configured rock on the sides to permit an angle between the driveshaft and first coupler.

According to another embodiment, a drive system for a vehicle closure includes a drive unit having a motor operatable connected to a coupler with a first longitudinal axis. The coupler defines a polygon-shaped receptacle having a plurality of sides arrayed around the first longitudinal axis and circumferentially interconnected to form a plurality of inside corners extending parallel to the first axis. A driveshaft has a second longitudinal axis that is angled relative to the first longitudinal axis. The driveshaft includes a central portion and a first ball end arranged along the second longitudinal axis. The first ball end has a tip, a neck joined to the central portion, and defines a plurality of engaging surfaces that are arcuate in a direction parallel to the second longitudinal axis and are circumferentially arranged around the second axis such that the engaging surfaces are joined to each other at arcuate edges that extend between the neck and the tip. Wherein, the first ball end is received in the receptacle with the engaging surfaces disposed against the sides and the arcuate edges received in the inside corners to rotationally fix the driveshaft to the coupler, and wherein each of the engaging surface includes at least a first portion and a second portion that are longitudinal spaced from each other such that, when the driveshaft is in a first angled position relative to the first longitudinal axis, the first portion is in contact with a corresponding one of the sides while the second portion is not in contact with the corresponding side.

According to yet another embodiment, a vehicle closure system includes a vehicle closure pivotally attachable to a vehicle body, the closure including panels defining an interior. A first coupler is supported in one of the panels of the closure for rotation about a first axis. A brace is disposed in the interior such that the first axis extends through the brace. A drive system is configured to pivot the closure relative to the vehicle body and is disposed in the interior. The drive system has a motor and a second coupler operably coupled to the motor. The second coupler is supported for rotation about a second axis that is parallel to and vertically offset from the first axis such that the second axis does not extend through the brace. A driveshaft is angled to extend between the first and second axes and having a first end wobbably connected to the first coupler and a second end wobbably connected to the second coupler.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles include many different components that are movable relative to each other. For example, a vehicle includes body and a variety of closures such as doors, tailgates, liftgates, etc. depending on the type of vehicle. One or more of these closures may be automatically opened, closed, or both. A latch is used to secure the closure closed.

A seal is typically provided on the body, the closure, or both to seal the cabin from the elements. A closure may be described as having an open position, a partially closed position in which the latch is in contact with a striker of the closure and the closure is resting on the seal, and a fully closed position in which the latch is locked and the seal is compressed. This disclosure presents a drive-system capable of pivoting a vehicle closure, e.g., a tailgate.

Figure 1:
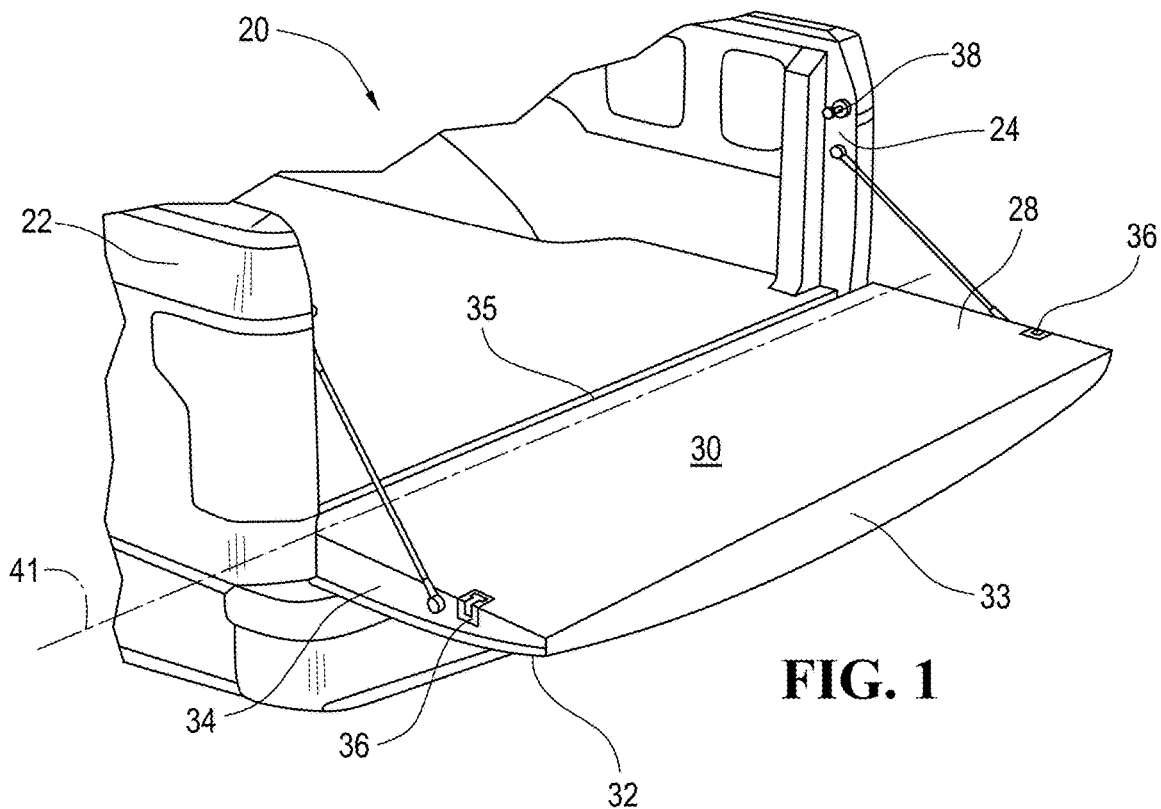
FIG. 1 is a rear perspective view of a portion of a pickup truck.

Referring to FIG. 1, a vehicle 20, such as a pickup truck, includes a body 22 and a closure 28 that is movably attached to the body 22 so that the closure can open and close. The closure may be a tailgate, a door, a hatch, a truck lid, a hood, or the like. In one example, the closure 28 is a tailgate pivotally attached to sidewalls 24 at a rear end of a box. In this embodiment, the tailgate 28 includes an inner panel 30, an outer panel 32, a pair of lateral side panels 34, a top panel 33, and a bottom panel 35. In some embodiments, the lateral sides 34, top panel 33, and/or bottom panel 35 are integrally formed with the inner panel or the outer panel, and are secured to the other of the inner and outer panels by hemming or by another type of connection. Each of the lateral sides 34 includes a connection feature, e.g., a post, that is engageable with a corresponding connection feature, e.g., a socket, on one of the sidewalls 24. These post and sockets, for example, define a hinge of the tailgate that has a pivot axis 41 extending therethrough. The tailgate 28 pivots open and a closed along the connection features. Each lateral side 34 may support a latch 36 that cooperates with a corresponding striker 38 connected to one of the sidewalls 24. The latch 36 and the striker 38 secure the tailgate 28 closed. The tailgate 28 also includes a handle operably connected to the latches 36 and configured to disengage the latches 36 from the strikers 38 to open the tailgate 28. The vehicle may also be able to open the latches 36 remotely with the press of a button or the like. The latches 36 may include a lock operable by a key, a button, a key fob, etc. When locked, the tailgate 28 cannot be opened.

As will be described in more detail below, the closure 28 is configured to automatically open and/or close. The closure may include an actuator, such as an electric motor, that pivots the closure between the open and closed positions. The vehicle may include an input, e.g., a button, located within the passenger cabin, on a key fob, etc., that when pressed, commands actuation of the closure.

Figure 2:
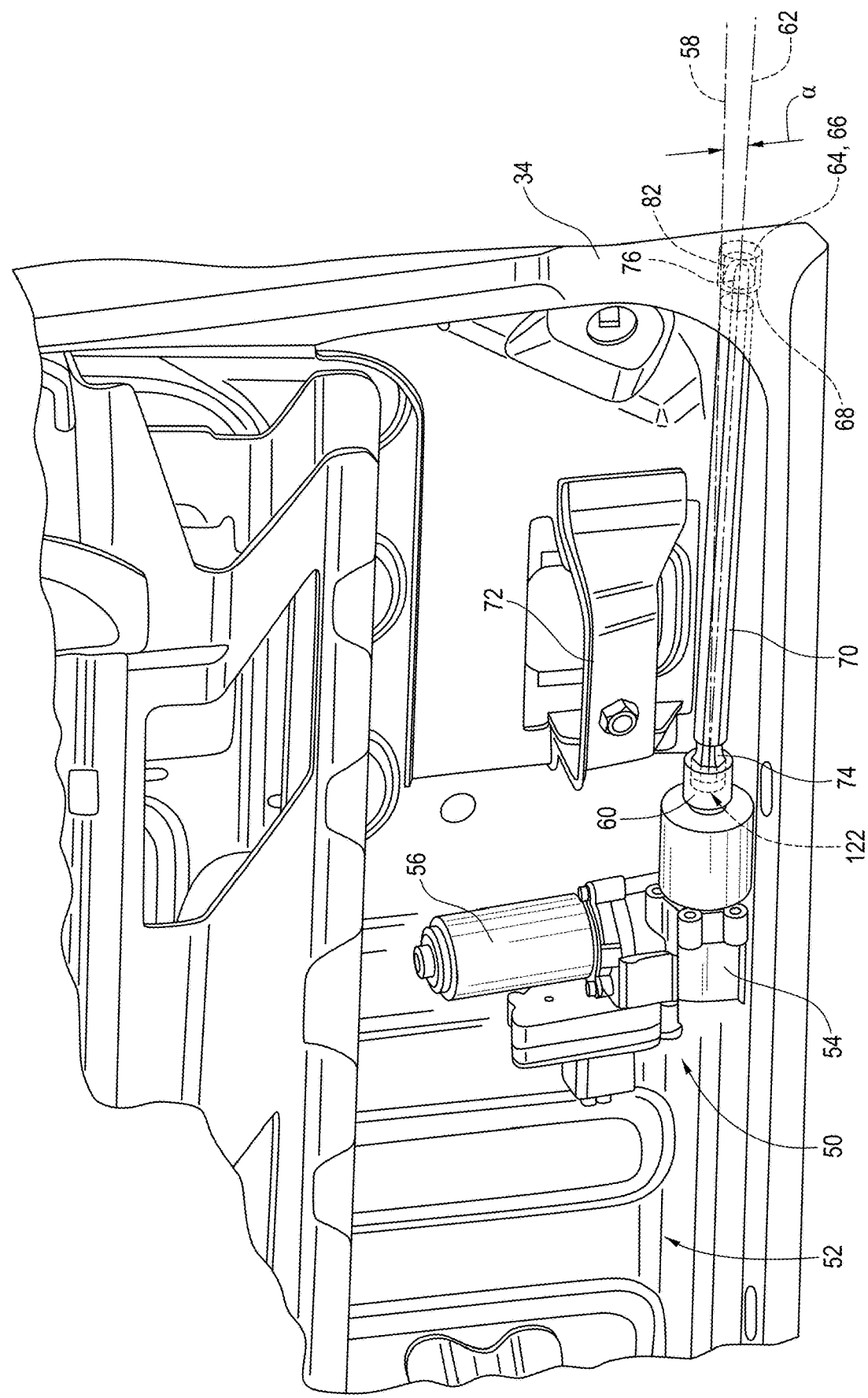
FIG. 2 is a perspective view of the closure with a back panel removed to illustrate internal components including a drive system of the closure.

Referring to FIG. 2, the closure system will be described in a tailgate application, but it is to be understood that this is just an example; the closure system may be used in other applications such a door, a rear hatch, a trunk lid, a hood, etc. The closure 28, e.g., a tailgate, includes a drive unit 50 for closing the tailgate 28 disposed within an interior 52 of the closure 28. The drive unit includes a housing 54 that may support at components of a gearing arrangement or the like. The housing may be attached to the bottom panel 35 by fasteners or the like. The drive unit 50 includes an actuator 56 such as an electric motor 56. In the illustrated embodiment, the electric motor 56 is arranged vertically with an output of the motor being coupled to a gearing arrangement that transfers the vertical axis of the motor into a horizontal axis 58. The drive unit 50 further includes a coupler 60 supported for rotation about the axis 58. The coupler 60 is operably coupled to the motor 56 via the gearing arrangement or the like. The coupler 60 is the output of the drive unit 50.

A second coupler 64 is disposed in the lateral side 34 and may be supported by a bearing. The second coupler 64 is supported for rotation about a second axis 62 that is parallel to an offset from the axis 58 by a distance or offset (a). The second coupler 64 is configured to engage with a component that is rotationally fixed to the body 22 of the vehicle. For example, the second coupler includes a first side 66 that connects to the component of the vehicle 20 in a manner known in the art. A second side 68 of the second coupler 64 provides a connection for a driveshaft 70 that extends between the first coupler 60 and the second coupler 64 to operably couple the second coupler 64 to the electric motor 56. The driveshaft 70 may include a first end 74 operably coupled to the first coupler 60 and a second end 76 operably coupled to the second coupler 64.

The driveshaft 70 is angled to avoid the bracket 72. Due to the size of the drive unit 50, the output axis 58 extends through the bracket 72. Thus, in order to connect with the coupler 64, which is on the opposite side of the bracket 72, the driveshaft 70 has to angle downwardly from the first coupler 60 to the second coupler 64. The driveshaft 70 must be rotationally fixed to both couplers 60 and 64 in order to pivot the closure 28. Normally, a spline connection is used. However, that is not possible in this design due to the angle of the driveshaft. To accommodate this angle, at least one of the couplers, and in the illustrated embodiment both of the couplers, have a wobble connection between the coupler and end of the driveshaft. The wobble connection provides the necessary rotational fixing while allowing an angle between the driveshaft and the axes of rotation 58 and 62.

The first coupler 60 may define a first receptacle 80 that receives the end 74 therein and the second coupler 64 may define a second receptacle 82 that receives the end 76 therein. The receptacles and the ends may be sized and shaped to form the wobble connection(s). The wobble connections may be configured as constant velocity connections in which the coupler and the driveshaft have a same velocity is each other.

In the above closure 28, the driveshaft is grounded to the vehicle by the coupler 64 and does not rotate. Instead, the housing 54 and the electric motor 56 rotate with the closure about the axis 58 to pivot the closure 28 open and close. That is, the driveshaft is fixed to the vehicle and the actuator is fixed to the closure.

The following figures and associated text describe examples of the driveshaft 70 and the couplers 60, 64.

Figure 3:
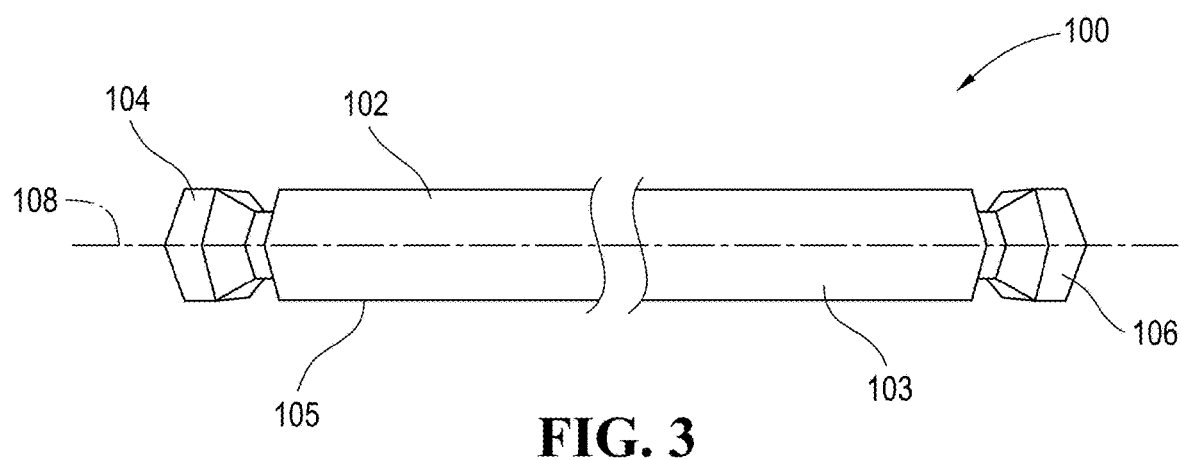
FIG. 3 is a perspective view of a driveshaft of the drive system.
Figure 4:
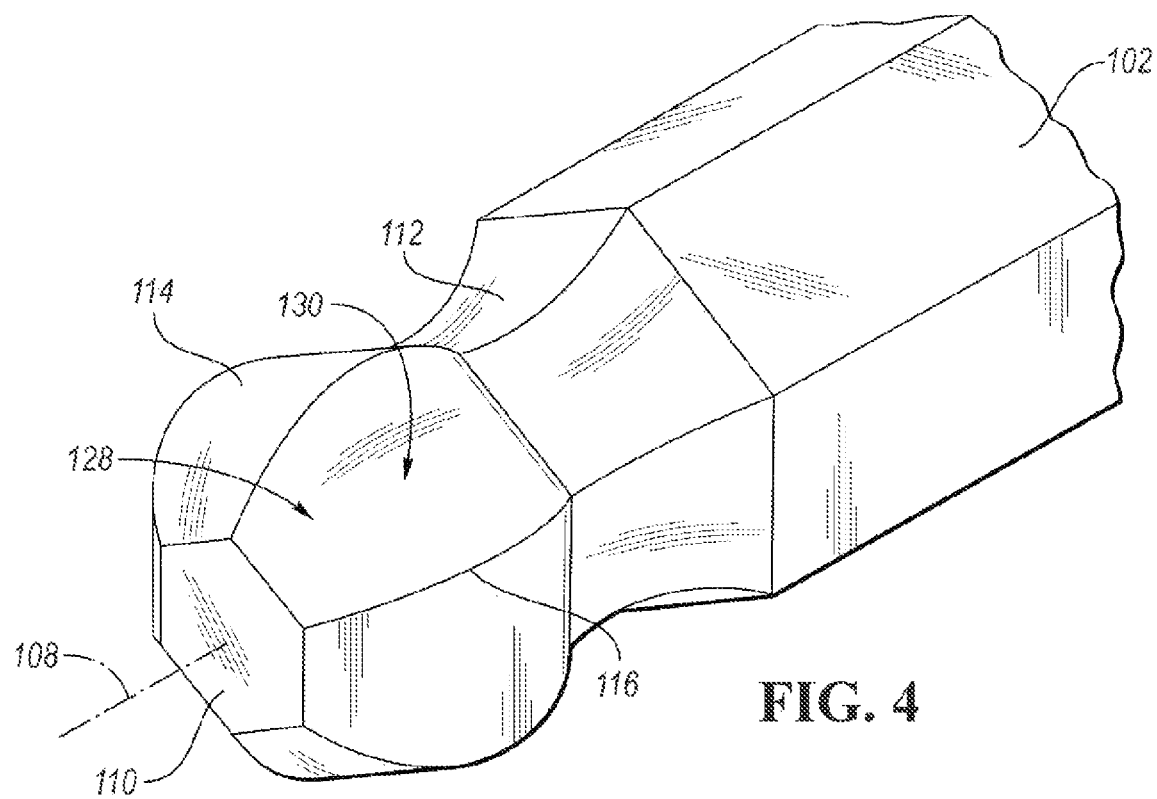
FIG. 4 is a perspective view of a first end of the driveshaft.

Referring to FIGS. 3 and 4, a driveshaft 100 is one example embodiment of the driveshaft for the drive system. The driveshaft includes a central portion 102, a first bulbous end 104 and a second bulbous end 106. The ends and the central portion may be integrally formed, such as machined from a common bar stock. The first and second ball ends are configured to form the wobble connection with the couplers. The driveshaft 100 has a longitudinal axis or centerline 108. The central portion 102 may have six sides 103 interconnected at six longitudinal edges 105 and a hexagonal cross-section.

The first bulbous end 104 has a tip 110 and a neck 112 joined to the central portion 102. The first bulbous end 104 defines a plurality of engaging surfaces 114 that are arcuate in a direction parallel to the longitudinal axis 108 and are circumferentially arranged around the axis 108 such that the engaging surfaces 114 are joined to each other at arcuate edges 116 that extend between the neck and the tip. The number of engaging surfaces 114 and arcuate edges 116 may match the sides 103 and edges 105 of the central portion. In the illustrated embodiment, the first end 104 has six engaging surfaces 114 and six arcuate edges 116. The engaging surfaces 114 are circumferentially aligned with the sides 103 and the arcuate edges 116 are circumferentially aligned with the edges 105. The second bulbous end 106 may be the same as the first bulbous end 104 and will not be explained again for brevity. The receptacles of both couplers may also be the same.

Figure 5:
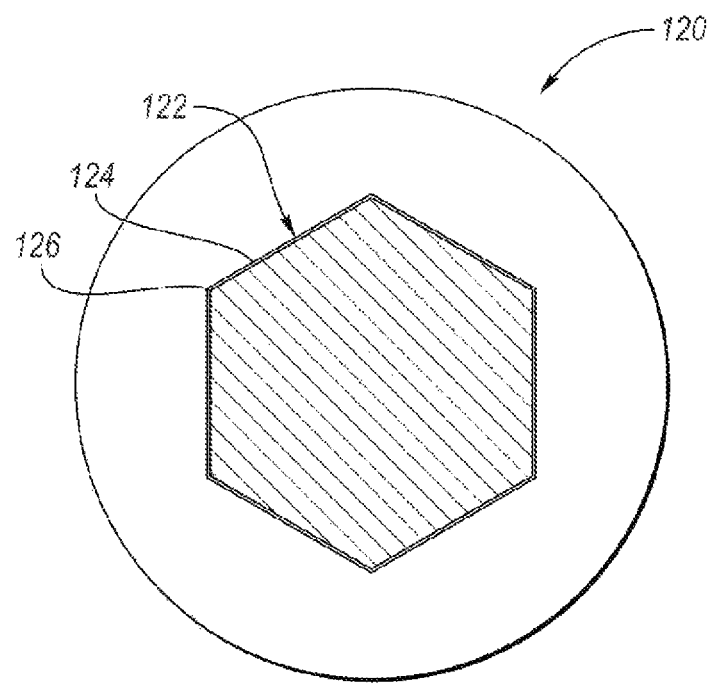
FIG. 5 is a cross-sectional view at connection of the coupler to the driveshaft.

FIG. 5 illustrates a wobble connection 120 between the first coupler 60 and the first bulbous end 104 according to one or more embodiments. In this example, the first coupler 60 defines a polygon-shaped receptacle 122 having a plurality of sides 124 arrayed around a longitudinal axis of the coupler 60, which is coaxial with the axis 58. The sides 124 are circumferentially interconnected to form a plurality of inside corners 126 extending parallel to the axis 58. In this embodiment, the receptacle 122 has six sides and six inside corners to match the six sides of the driveshaft 100. The receptacle 122 is sized substantially the same as the first bulbous end 104 albeit slightly larger to accommodate assembly. While the illustrated embodiment includes six sides, the number of sides for the driveshaft, ends, and receptacles may be more or less in other embodiments.

The first bulbous end 104 is received in the receptacle 122 with the engaging surfaces 114 disposed against the sides 124 and the arcuate edges 116 received in the inside corners 126 to rotationally fix the driveshaft 100 to the coupler 60 while permitting and angle between the receptacle 122 and the first bulbous end 104 of driveshaft.

Figure 6:
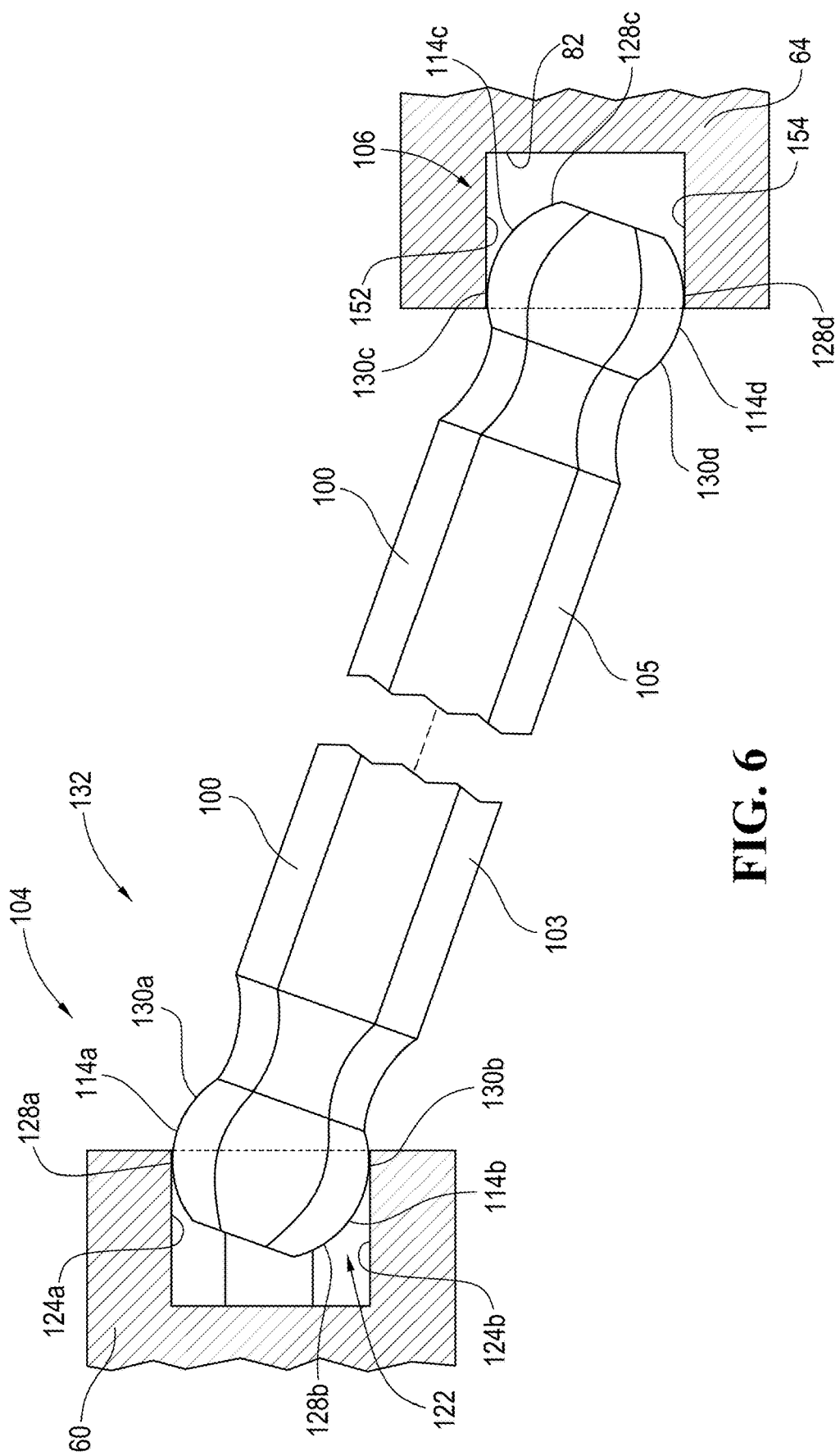
FIG. 6 illustrates a side view of the driveshaft connected to the couplers at a first orientation.
Figure 7:
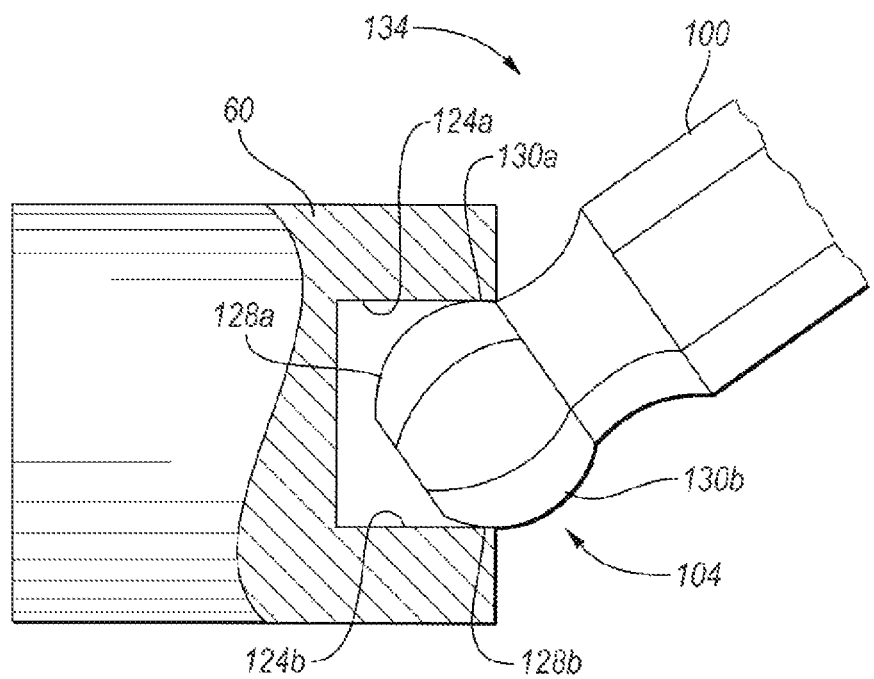
FIG. 7 illustrates a side view of the driveshaft connected a coupler at a second orientation.

Referring to FIGS. 4, 6, and 7, the arcuate shape of the engaging surfaces 114 and the edges 116 allow the first bulbous end 104 to tilt or rock within the first receptacle 122 resulting in only a portion of each the engaging surfaces being engaged with the corresponding side 124 at any one time. For example, each of the engaging surfaces 144 includes at least a forward-most portion 128, rear-most second portion 130, and a plurality (which may be an infinite number) of intermediate portions therebetween. These portions are arranged along the longitudinal axis 108 with the forward portion 128 and the rear portion 130 being longitudinal spaced from each other.

FIGS. 6 and 7 illustrate how the driveshaft may be angled relative to the coupler and how the ball end moves with the receptacle to achieve these different angled orientations of the driveshaft. As will be explained in more detail below, the arcuate nature of the engaging surfaces 114 and the edges 116 allow for the first bulbous end 104 rock or tilt relative to the sides 124 of the receptacle to permit angling of the driveshaft.

FIG. 6 illustrates the first coupler 60 and driveshaft 100 in a first position 132. As can be seen, the driveshaft 100 is angled downwardly and the first bulbous end 104 is tilted within the first receptacle 122. For illustrative purposes, the driveshaft is shown in the most downward tilted position. It is to be understood, however, that the offset between the axes 58 and 62 may not require such an extreme angle of the driveshaft. (In this illustration, the sides 124a and 124b are diametrically opposed as are the engaging surfaces 114a and 114b.) In the first position 132, the forward-most portion 128a is engaged with the side 124a while the rearmost portion 130a is disengaged. At the bottom of the connection, the rear-most portion 130b is engaged with the side 124b while the forward-most portion 128 is disengaged.

FIG. 7 illustrates the coupler and the driveshaft 100 and a second position 134 in which the driveshaft is now angled upwardly from the coupler 60. For illustrative purposes, the driveshaft is shown in the most upwardly tilted position. Here, the forward-most portion 128a is now disengaged and the rear-most portion 130a is engaged with the side 124a. The forward-most portion 128b is now engaged with the side 124b while the rear-most portion 130b is disengaged. During the transition between positions 132 and 134, the arcuate engaging surfaces 114 have rocked on the sides 124 via the arcuate surface of the engaging surfaces 114 and edges 116.

Referring back to FIG. 6, the second coupler 64 defines a receptacle 82, which may be the same as receptacle 122. The receptacle 82 includes a first side 152 and a second side 154 that are diametrically opposed. The second bulbous end 106, which may be the same as the first bulbous end 104, has engaging surfaces 114c and 114d that are diametrically opposed. Due to the angle of the driveshaft 100, the rear-most portion 130c is engaged with the side 152 while the forward-most portion 128a is disengaged, and the forward-most portion 128d is engaged with the side 154 while the rear-most portion 130d is disengaged.

Figure 8:
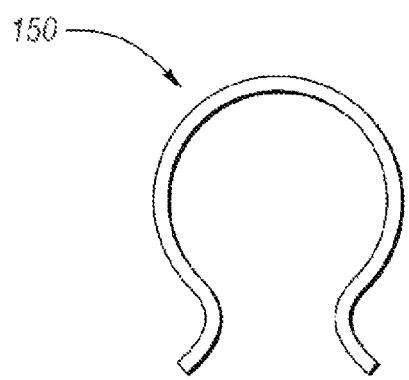
FIG. 8 is a side view of a connection including a retaining member.
Figure 9:
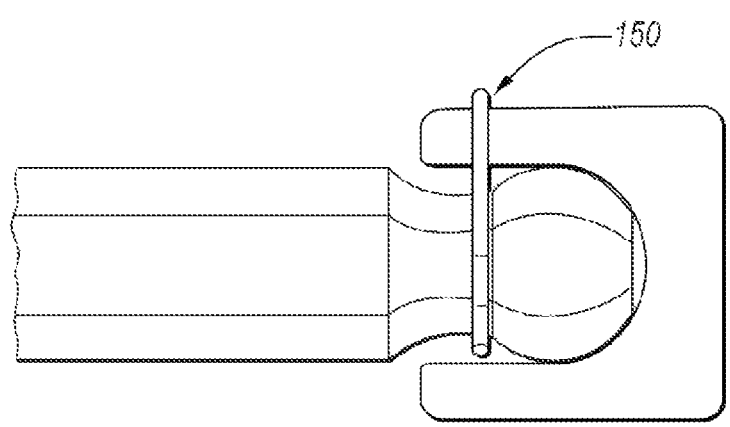
FIG. 9 is a perspective view of a retaining member.

Referring to FIGS. 8 and 9, one or more retainers 150 (optional) may be provided to secure the one or more ends to the one or more couplers. For example, a first retainer 150 is connected between the first bulbous end 104 and the coupler 60 to retain the first end in the receptacle 122.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A drive system for use in a tailgate of a pickup truck, the drive system comprising:
a drive unit disposed in an interior cavity defined by the tailgate and including a motor operatively connected to a first coupler having a first longitudinal axis, the first coupler defining a polygon-shaped receptacle having a plurality of first inner walls circumferentially interconnected to form a plurality of inside corners extending parallel to and radially spaced apart from the first longitudinal axis;
a driveshaft having a second longitudinal axis that is angled relative to the first longitudinal axis, the driveshaft including a central portion and a first bulbous end, the first bulbous end arranged along the second longitudinal axis, the first bulbous end having a tip and a neck, wherein the neck is joined to the central portion, and the first bulbous end defines a first plurality of engaging surfaces that are arcuate in a direction parallel to the second longitudinal axis and are circumferentially arranged around the second axis such that the first plurality of engaging surfaces are joined to each other at arcuate edges that extend between the neck and the tip, the driveshaft having a second bulbous end formed on the driveshaft opposite the first bulbous end and being coaxial with the second longitudinal axis, wherein the first bulbous end is received in the receptacle in which the inside corners receive the arcuate edges to rotationally fix the driveshaft to the first coupler;

each engaging surface of the first plurality of engaging surfaces includes at least a first portion and a second portion that are longitudinally spaced from each other such that, when the second axis of the driveshaft is in a first angled position relative to the first longitudinal axis, the first portion of a first engaging surface of the first plurality of engaging surfaces contacts a corresponding inner wall of the plurality of first inner walls, while the second portion of the first engaging surface of the first plurality of engaging surfaces is not in contact with the corresponding inner wall; and wherein the drive unit includes a motor having a longitudinal axis arranged orthogonal to at least one of the first and second longitudinal axes.

2. The drive system of claim 1, wherein, when the second axis of the driveshaft is in a second angled position relative to the first longitudinal axis, the second portion of the first engaging surface of the first plurality of engaging surfaces is in contact with the corresponding inner wall while the first portion of the first engaging surface of the first plurality of engaging surfaces is not in contact with the corresponding inner wall.

3. The drive system of claim 1, further comprising a retainer connected between the first end and the coupler to retain the first bulbous end in the receptacle.

4. The drive system of claim 3, wherein the retainer is a C-clip.

5. The drive system of claim 1, wherein the plurality of first inner walls of the receptacle are in equal number to the first plurality of engaging surfaces of the first bulbous end.

6. The drive system of claim 5, further comprising:

a second coupler defining a second polygon-shaped receptacle having a plurality of second inner walls circumferentially interconnected to form a plurality of second inside corners extending parallel to and radially spaced apart from a third longitudinal axis of the second coupler, wherein the second bulbous end includes a second tip and a second neck, wherein the second neck is joined to the central portion, and the second bulbous end defines a second plurality of engaging surfaces that are arcuate in a direction parallel to the second longitudinal axis and are circumferentially arranged around the second longitudinal axis such that the second plurality of engaging surfaces are joined to each other at second arcuate edges extending between the second neck and the second tip, wherein the second bulbous end is received in the second receptacle, and the second inside corners receive the second arcuate edges to rotationally fix the driveshaft to the second coupler.

7. The drive system of claim 6, wherein each engaging surface of the second plurality of engaging surfaces of the second bulbous end includes a first portion and a second portion longitudinally spaced from each other such that, when the second axis of the driveshaft is in the first angled position, the first portion of at least one of the second plurality of engaging surfaces contacts a corresponding second inner wall of the plurality of second inner walls while the second portion of the at least one of the second plurality of engaging surfaces is not in contact with the corresponding second inner wall.

8. A drive system for use in a tailgate of a pickup truck, the drive system comprising:

a drive unit disposed in an interior cavity defined by the tailgate and including a first coupler supported for rotation about a first longitudinal axis, the first coupler defining a first receptacle;

a motor operatively connected to the first coupler;

a second coupler disposed in a sidewall of the tailgate and including a first side and a second side, the second side configured to engage with a hinge component of the pickup truck, the second coupler supported for rotation about a second longitudinal axis that is parallel to and offset from the first axis, wherein the sidewall of the tailgate partially defines the interior cavity; and a driveshaft extending between the first and second couplers at an angled orientation relative to the first and second axes, the driveshaft including a first end connected to the first coupler and a second end connected to the first side of the second coupler, the first end defining a first plurality of engaging surfaces, the first plurality of engaging surfaces being arcuate in a direction parallel to a third longitudinal axis of the driveshaft and circumferentially arranged around the third axis such that the engaging surfaces are joined to each other at edges that are arcuate in the direction parallel to the third axis, wherein the first end is received in the receptacle of the first coupler in which at least some engaging surfaces of the first plurality of engaging surfaces are disposed against first inner walls of the first receptacle such that the first plurality of engaging surfaces are configured rock with respect to the first inner walls to permit the third axis of the driveshaft to be angled relative to the first axis of the first coupler, and a longitudinal axis of the motor is arranged orthogonal to at least one of the first and second longitudinal axes.

9. The drive system of claim 8, wherein the first side of the second coupler defines a second receptacle, and wherein the second end of the driveshaft defines a second plurality of engaging surfaces that are arcuate in the direction parallel to the third longitudinal axis of the driveshaft and are circumferentially arranged around the third axis such that the second plurality of engaging surfaces are joined to each other at second edges that are arcuate in the direction parallel to the third axis, wherein the second end is received in the second receptacle of the second coupler in which the second engaging surfaces are disposed against second inner walls of the second receptacle such that the second engaging surfaces rock with respect to the second inner walls to permit rotation of the driveshaft and the second coupler while the third axis of the drive shaft is angled relative to the second axis of the second coupler.

10. The drive system of claim 8 further comprising a retainer connected between the first end and the first coupler to retain the first end in the receptacle.

11. The drive system of claim 10, wherein the retainer is a C-clip.

12. The drive system of claim 10 further comprising a second retainer connected between the second end and the second coupler.

13. The drive system of claim 12, wherein the second retainer is a C-clip.

14. The drive system of claim 8, wherein the first inner walls of the receptacle are in equal number to the engaging surfaces of the first end.

15. A tailgate system for use in a pickup truck, the tailgate system comprising:
- a tailgate pivotally attachable to a truck bed of the pickup truck, the tailgate including panels defining an interior;
- a drive unit configured to pivot the tailgate relative to a body of the pickup truck and disposed in the interior, the drive unit including a motor and a first coupler directly and operably coupled to the motor, the first coupler being supported for rotation about a first axis and a longitudinal axis of the motor arranged orthogonal to the first axis;
- a second coupler supported in one of the panels of the tailgate for rotation about a second axis that is parallel to and vertically offset from the first axis; and
- a driveshaft having a first end wobbably connected to the first coupler and a second end wobbably connected to the second coupler.

16. The tailgate system of claim 15, wherein the drive unit includes a housing attached to a bottom side of one of the panels.

17. The tailgate system of claim 15, wherein the second coupler defines a polygon-shaped receptacle having a plurality of inner walls circumferentially interconnected to form a plurality of inside corners extending parallel to and radially spaced apart from the second axis, wherein the second end of the driveshaft has a tip and a neck, the neck joined to a central portion of the driveshaft, the second end defining a plurality of engaging surfaces that are arcuate in a direction parallel to a longitudinal axis of the driveshaft and are circumferentially arranged around the longitudinal axis of the driveshaft such that the engaging surfaces are joined to each other at arcuate edges that extend between the neck and the tip,
- wherein the second end is received in the receptacle with the engaging surfaces disposed against corresponding ones of the inner walls of the receptacle and the arcuate edges received in the inside corners to wobbably connect the driveshaft to the second coupler in a rotationally fixed manner, and wherein each of the engaging surfaces includes at least a first portion and a second portion that are longitudinal spaced from each other such that, when the driveshaft is in a position, the first portion of at least one of the engaging surfaces is in contact with the corresponding one of the inner walls while the second portion of the at least one one of the inner walls the engaging surfaces is not in contact with the corresponding side.

* * * * *